United States Patent [19]
Steely, Jr.

[11] Patent Number: 5,551,048
[45] Date of Patent: Aug. 27, 1996

[54] RING BASED DISTRIBUTED COMMUNICATION BUS FOR A MULTIPROCESSOR NETWORK

[75] Inventor: Simon C. Steely, Jr., Hudson, N.H.

[73] Assignee: Digital Equipment Corporation, Maynard, Mass.

[21] Appl. No.: 253,474

[22] Filed: Jun. 3, 1994

[51] Int. Cl.⁶ ................................................. G06F 12/00
[52] U.S. Cl. .................... 395/800; 395/200.18; 395/468; 364/DIG. 1; 364/243.41; 364/242.94
[58] Field of Search ..................................... 395/200, 425, 395/200.03, 200.18, 200.21, 403, 468, 800

[56] References Cited

U.S. PATENT DOCUMENTS

| | | | |
|---|---|---|---|
| 4,466,060 | 8/1984 | Riddle | 395/200 |
| 4,894,823 | 1/1990 | Adelmann et al. | 370/60 |
| 5,043,885 | 8/1991 | Robinson | 395/425 |
| 5,088,032 | 2/1992 | Bosack | 395/200 |
| 5,191,652 | 3/1993 | Dias et al. | 395/200 |
| 5,197,146 | 3/1993 | La Fetra | 395/425 |
| 5,249,283 | 9/1993 | Boland | 395/425 |
| 5,265,235 | 11/1993 | Sindhu et al. | 395/425 |
| 5,341,483 | 9/1994 | Frank et al. | 395/406 |
| 5,386,536 | 1/1995 | Courts et al. | 395/425 |
| 5,386,546 | 1/1995 | Hamaguchi | 395/425 |

*Primary Examiner*—Mehmet B. Geckil
*Assistant Examiner*—Robert E. Stachler, II
*Attorney, Agent, or Firm*—Lindsay G. McGuinness; Denis G. Maloney; Arthur W. Fisher

[57] ABSTRACT

A method for providing communication between a plurality of nodes coupled in a ring arrangement, wherein a plurality of the nodes comprise processors each having a cache memory for storing a subset of shared data. Each of the nodes on the ring deposits data into a data slot during a given time period. The data deposited by each node may comprise an address field and a node field. To ensure data coherency between the caches, each processor on the ring includes a queue for saving a plurality of received data representative of the latest bus data transmitted on the bus. As each processor receives new data, the new data is compared against the plurality of saved data in the queue to determine if the address field of the new data matches the address field of any of the saved data of the queue. In the event that the new data matches one of the plurality of saved data, it is determined whether the new data represents updated data from the memory device. If the new data represents updated data it is shifted into the queue. If it does not represent updated data, it is discarded.

12 Claims, 3 Drawing Sheets

RING BASED DISTRIBUTED COMMUNICATION BUS FOR A MULTIPROCESSOR NETWORK

FIELD OF THE INVENTION

This invention relates generally to multiprocessor computer systems and more specifically to communication between processors within a multiprocessor computer system.

BACKGROUND OF THE INVENTION

As it is known in the art, multiprocessor computer systems generally include a plurality of processing systems coupled to a common, shared bus for communications with a shared memory device. In addition, an I/O subsystem may also be coupled to the bus for communication with the memory device.

Each of the processing systems generally includes a cache memory for temporary storage of data from the shared memory device. The cache allows the processor to process an instruction stream and modify data independent of the activities of the other processors. A problem arises, however, when more than one of the caches in the respective processing systems needs to utilize data which is currently being modified in a cache of a different processing system. In such an event, some arbitration protocol must be implemented to ensure that the data used by the respective caches remains coherent.

Because all of processors are coupled to the memory device via a shared memory bus, each of the processors 'see' the data that is provided to or received from the memory device in the same order. Therefore, each processor can regulate the contents of their internal cache to ensure that it contains the most updated data. Multiprocessor systems have typically used the shared bus arrangement because it provides a straight forward mechanism for maintaining cache coherency among caches in a plurality of different processing systems.

However, there are some limitations to the shared bus arrangement. The performance of a multiprocessor system is generally a function of the cycle time of the shared bus. In order to increase the performance, the cycle time of the shared bus must be decreased. However, in order to decrease the cycle time of the bus, the number of processors coupled to the bus and the length of the bus must be decreased. Thus it is difficult to provide a shared bus with a desired cycle time that is capable of supporting all of the processors which are required in a multiprocessor system.

Present day technology is finding it difficult to build busses with a cycle time faster than about 10 nanoseconds. Even so, with processor cycle times decreasing into the 2–3 nanosecond range, the performance of multiprocessor systems are constrained by the performance of the shared bus. It would be desirable to provide a multiprocessor architecture which would be able to utilize the increasing performance provided by present day processors.

A BRIEF DESCRIPTION OF THE DRAWINGS

SUMMARY OF THE INVENTION

In accordance with the present invention, a method for providing communication between a plurality of nodes coupled in a ring arrangement includes the steps of receiving, at an input of each node, data from one of the neighboring nodes on the ring, and depositing, at an output of each node during the predetermined time period, data onto the ring, wherein the data deposited by each node is either the data received at the input of the node or data provided by the respective node. The method additionally includes the steps of maintaining coherency between cache memories in each of the plurality nodes by at each node, storing a plurality of the data received at the respective input during the predetermined time period in a queue, and comparing the received data from one of the neighboring nodes against the data stored in the queue. With such an arrangement, a high performance multiprocessor system having a common memory is provided having higher performance than a bus and still maintaining coherency between the processors in a manner analogous to a bus.

DESCRIPTION OF THE PREFERRED EMBODIMENT

Figure 1:
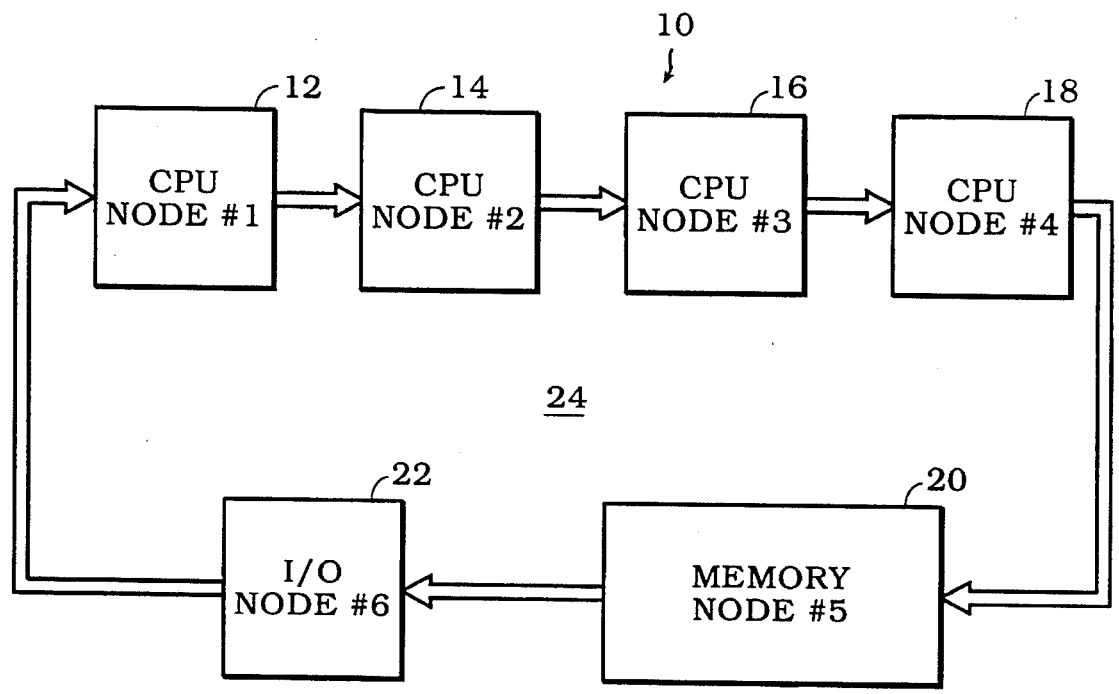
FIG. 1 is a block diagram illustrating a multiprocessor computer system according to the invention.

Referring now to FIG. 1, a multiprocessor system 10 according to the invention is shown to include a ring 24 including a plurality of nodes, shown here labelled as elements 12, 14, 16, 18, 20, and 22 respectively. The plurality of nodes include a plurality of processing systems, 12, 14, 16, and 18 coupled to provide point to point connection between neighboring nodes on the ring 24. A memory device 20 and an I/O device 22 also comprise nodes of ring 24.

In a typical multiprocessor system, each of the processing systems 12 through 18 is capable of operating independently on an instruction stream provided by a central processing unit (CPU) within the respective processing system. Each of the processing systems 12 through 18 is capable of communicating with the I/O device 22 for exchanging data between external devices; e.g., a printer, a disk, or another external drive (not shown). Each of the processor systems 12 through 18, as well as the I/O device 22, use data which is stored in the memory device 20. As a result, because each of the processors is using common data stored in memory, there is a potential that the processors may be using some of the same data stored at the same location of memory at the same time. This has been historically known to present a problem of coherency, i.e., ensuring that each of the processing systems, as well as the I/O device, receive the latest, updated memory data for each of its transactions.

Previously implemented multiprocessor architectures provide a shared system bus where each processor on the bus monitors transactions which occur on the bus. Such an arrangement allows for each of the processors to 'see' the same transaction at the same time, and thereby maintain coherency in their cache by updating or invalidating the contents of the cache based on the current transaction. However, the performance of the multiprocessor system was limited by the speed of the shared bus.

The multiprocessor system of FIG. 1 allows each node on the ring 24 to maintain a coherent cache while maximizing the rate of data transfer between nodes of ring 24. The data rate is maximized because each node is connected to the next node in a point-to-point fashion. Coherency is maintained through the use of a ring based protocol where the nodes are coupled in a ring formation and each of the nodes of the ring is assigned a unique node number identifying its location on the ring. Node numbers are assigned in ascending order and each of the nodes on ring 24 is aware of how many total nodes there are on the ring. As will be described in more detail below, each node keeps track of the information provided by the other nodes on the ring and uses this information to maintain coherency in its own internal cache.

Figure 2:
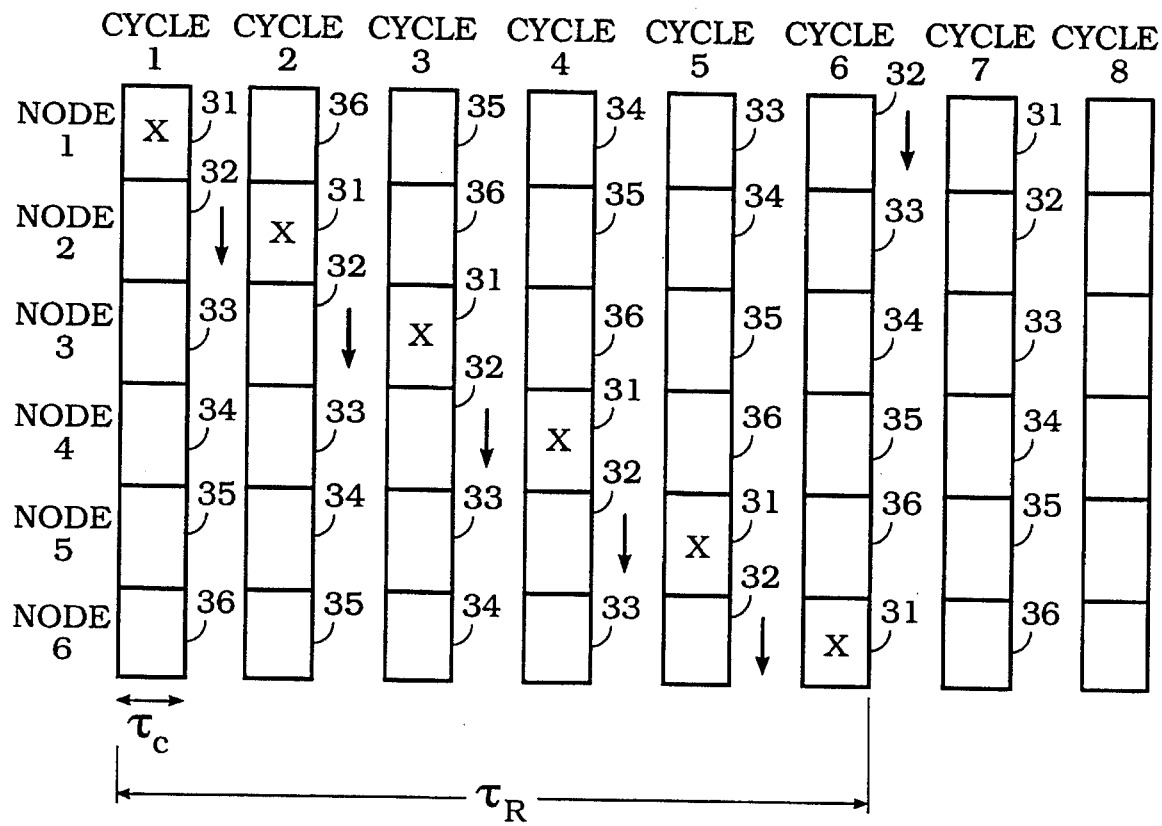
FIG. 2 is a timing diagram illustrating traversal of data between nodes in the multiprocessing system of FIG. 1.

Referring now to FIG. 2, each node of the ring 24 communicates within a fixed time period $\tau_c$ with the neighboring node. Hereinafter, the fixed time period $\tau_c$ where each node may deposit data onto the ring is called a 'cycle'. Because each and every node may transmit something to the bus in each cycle, the ring can be thought of as comprising a plurality of 'data slots', where each node places data into a data slot each cycle. As shown in FIG. 2, data deposited by each node 1–6 is represented by data slots 31–36 respectively.

For example, in FIG. 2, 8 cycles of data transfer are shown, each cycle having data slots corresponding to the number of nodes on ring 24. As each node deposits data onto the ring, it propagates to the neighboring node so that the other nodes in the ring can monitor transactions which alter the memory device 20. Thus, if the 'X' represents data deposited in data slot 31 of FIG. 2 Node 1, at the start of cycle 2 Node 2 inputs the data, and at the end of cycle 2, Node 2 outputs the 'X' onto the ring. Similarly, in Cycle 3, Node 3 outputs the 'X', in cycle 4, Node 4 outputs the 'X', and so on. Finally, at the end of cycle 6, Node 6 outputs the 'X' onto the ring, and at the start of Cycle 7, Node 1 receives the data 'X' which it originally transmitted. When Node 1 receives data 'X', it knows that it originally transmitted the data, and 'deletes' it from the ring by providing new data to the ring during this data slot, or by providing NULL data to the ring during the data slot.

Each node may transmit new data to memory 20, I/O device 22, or another processor 12–18 if the data slot available to it in a given cycle is not being used by another processor. For example, in FIG. 2, Node 2 could not transfer its own command during Cycle 2 because it must propagate the data provided by Node 1 in cycle 1. Thus, in this example data slot 31 is temporarily unavailable for use by any of the nodes on the ring until it propagates back to Node 1 in cycle 7, at which point Node 1 will delete the command from the data slot.

Each node knows the number of cycles it takes for data which it outputs onto the ring to reach its destination. Thus if the data 'X' transmitted by Node 1 in FIG. 2 is data for Node 4, Node 1 knows that it will reach its destination in cycle 4. In addition, each transmitting node knows the number of cycles that it takes for data which it outputs onto the ring to return to the transmitting node. The total delay for a data to traverse the ring is shown in FIG. 2 to be $\tau_R$.

Generally the number of bus cycles used to traverse the ring is equal to the number of nodes which are on the ring or some multiple of the number of nodes on the ring. However, it should be noted that a system may be provided where the number of bus cycles required to traverse the ring is greater than or less than the number of nodes in the ring.

Figure 3:
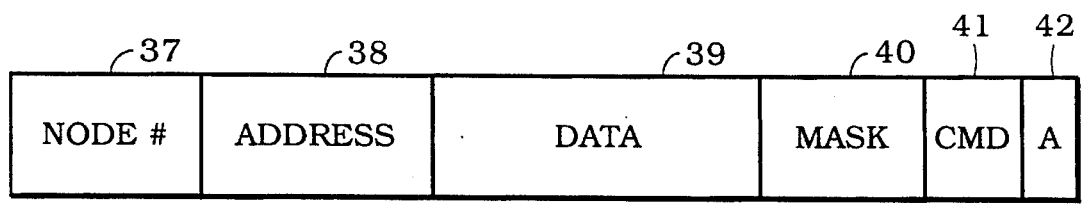
FIG. 3 illustrates a layout of the data transferred between the nodes during the time intervals of FIG. 2.

Referring now to FIG. 3, the data which is provided by the node during the data slots 31–36 of ring 24 are shown to include a node number field 37, an address field 38, a data field 39, a mask field 40, a command field 41, and an available bit 42. The node number field 37 identifies the node that transmitted the data onto the ring. The address field 38 identifies the address which is to be referenced, whether it be a memory address, an I/O address, or the address of another processor in the ring 24. The data field 39 contains write data for the memory 20, the I/O device 22, or another processor in the ring. The mask field 40 is used to indicate which bytes of data should be altered during the write. The command field 41 indicates which function will be provided, i.e. read, write, read/modify/write, etc. The available bit 42 is a staggered indicator, associated with a data slot, which indicates whether the data slot is available for use by the node receiving the data.

Referring again briefly to FIG. 2, during operation, the available bit 42 is read by each node to see if a subsequent data slot is available for them to deposit data onto the bus. For example, an available bit read by a node in cycle 1 indicates whether the data slot which it will receive in cycle 2 is available for use. Assume that Node 2 has a command which it would like to place on the ring 24. As mentioned above, data slot 31 is unavailable for use by Node 2 in cycle 2. Therefore, the available bit of the data in data slot 32 is set to unavailable. During cycle 1, Node 2 receives data slot 32 and determines that the data slot which it will receive in the next cycle is an invalid slot in which to deposit data. Thus, in cycle 2, when Node 2 receives data slot 31, it had been warned in advance not to overwrite the data in that data slot, since it is propagating a message from another node. Because data slot 36 is available for use in this example, the available bit of the data in data slot 31 is set to available. Thus as Node 2 reads the data field of data slot 31, it determines that the next data slot which it will receive is available for it to deposit new data into. Because Node 2 has data which it wants to transmit, it sets the available bit of data slot 31 during cycle 2 so that subsequent nodes in the ring will not overwrite the data which it will deposit in data slot 36.

Although the above example has described a one cycle latency between the assertion of the available bit and the available cycle, it should be noted that the available bit may correspond to an available cycle which is more than one cycle offset from the occurrence of the bit. The arrangement of having the available bit being provided prior to the available cycle is implemented because a processor is not typically able to decode the available bit and provide the data to the bus within the time constraint of the data slot. However, as speeds of processors increase, it may become feasible to align the available bit in the same bus cycle as the available cycle. Thus, the number of cycles between the available bit and the available cycle is determined by the amount of time required for data decode and preparation by a processor.

Figure 4:
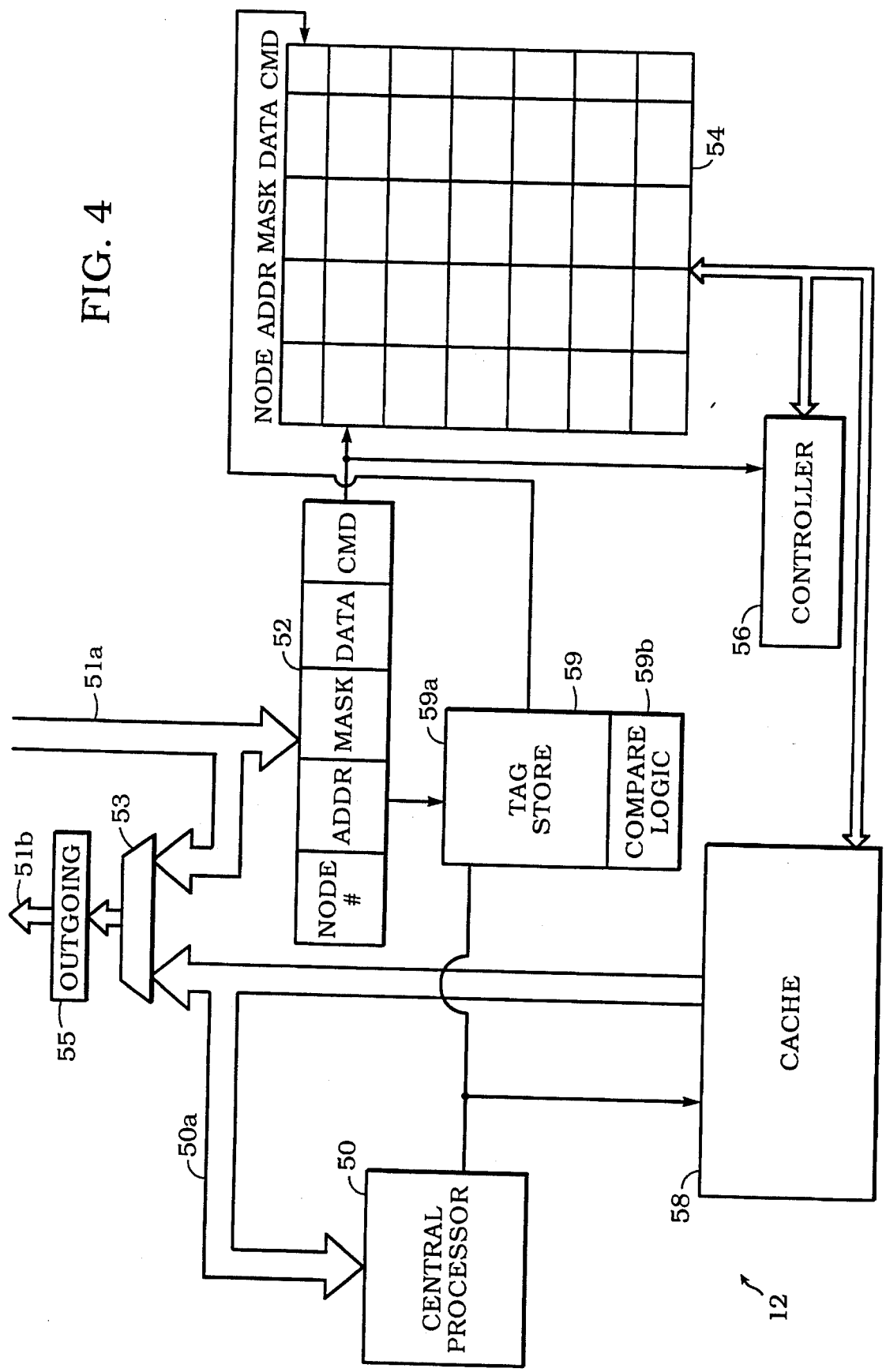
FIG. 4 is a block diagram illustrating the architecture of a processor in the multiprocessor system of FIG. 1.

Referring now to FIG. 4, a processor 12 is shown to include a CPU 50 coupled to provide an address and data to a cache 58. The CPU 30 is also coupled to tag logic 59. The processor 12 is couple to ring 24 by means of an input port 51a and an output port 5b. Data received from ring 24 via input port 51a is provided to a temporary storage register 52 and a multiplexer 53. Data from the central processor 50 or a cache memory 58 is provided by a bus 50a to the multiplexer 53. The multiplexer 53 selects either the data from the input port 51a or data from the processor 50 via bus 50a and stores the selected data in output register 55. Thus the multiplexer 53 provides a mechanism for either propagating another node's command through the processor 12, or providing a new command from the processor 12 to the ring 24.

The temporary storage register 52 is coupled to provide data to a ring queue 54. The ring queue 54 and the temporary storage register 52 are coupled to controller 56, which is used to provide data to cache 58 from the ring queue 54. The ring queue 54 stores the past 'N' cycles worth of data, where 'N' is dictated by the number of cycles which are required for a data slot to traverse the ring 24.

The tag logic 59 further comprises a tag store 59a and compare logic 59b. The tag store 59a is a storage device having a number of locations corresponding to the number of blocks of data in the cache 58. Each location of the tag store stores the upper address bits of the memory address of the data at the corresponding location in the cache 58. The upper bits of the memory address are commonly called a 'tag'. Generally both the cache and the tag store are accessed using a cache index comprising the lower bits of the memory address. At the same time that data is read from the cache 58, the tag is read from the tag store 59a. The compare logic 59b compares the upper address bits of the read address to the tag provided by the tag store to determine if there is a match.

During each cycle, the processor 12 stores the information received from input port 51a in its respective temporary storage register 52 and forwards the data to multiplexer 53. If the processor 12 is not providing its own data to the ring 24, the information received from the input port 51a is stored in output register 55. If the processor 12 is providing data to the ring during the cycle, the data is forwarded via bus 50a through multiplexer 53 and into output register 55. At the end of every cycle, the data in output register 55 is propagated to the next node in the ring.

During the period that the data is stored in the temporary register 52, the address field of the data in temporary register 52 is compared against the tags of tag store 59a to determine if the command in temporary register 52 is related to the contents of cache 58. During the compare, the lower bits of the address field are used to provide the cache index for addressing the tag store 59a while the upper address bits of the address field are compared against the tag provided by the tag store 59a to determine if there is a match.

If there is no match between the data in temporary storage register 52 and any of the tags, the data in temporary storage register 52 is dropped, and NULL data is shifted into the ring queue 54. If it was determined that there is a match between the address fields and the tag, compare logic 59b operates to determine whether or not the data in temporary storage register 52 should be shifted into the ring queue 54.

Even though data which is stored in temporary storage register 52 may contain data which would affect cache 58, the stored data cycles in the ring queue 54 determine whether or not the data in temporary storage register 52 should be shifted into the queue. Because the processors communicate in a ring arrangement, there is a possibility that 'older' data may arrive at a node after 'newer', updated data has already arrived. For example, referring briefly to FIG. 1, assume that Node 1 (CPU 12) is the receiving node in question. Node 5, which is memory, may be servicing a read request and as such places the read data on the ring. Assume that at the same time, Node 6 writes the same memory location, and places the data for the write on the ring. As the data propagates around the ring, the write from Node 6 will reach Node 1 before the read data from Node 5. When the data from Node 5 is stored in the temporary storage register 52 at Node 1, the data from Node 6 is already in the queue of Node 1. The data from Node 5 should not be applied to the cache because it would overwrite the valid and 'newer' write data provided by Node 1. Therefore, the data in the temporary storage register is discarded, and NULL data, which does not effect the cache, is shifted into the queue 54.

A second situation may occur when the data in the temporary storage register 52 is more recent than data which is stored in the ring queue 54. For example, operating again from the viewpoint of Node 1, if Node 3 executes a write to memory 20 during the same cycle that Node 5 services a read from memory 20, then the read from Node 5 will already be stored in the ring queue 54 of Node 1 when the write from Node 3 is stored in the temporary storage register 52 of Node 1. Because the temporary storage register 52 contains the most recent memory data for that cache location, it is shifted into the ring queue 54. Thus, although the cache may be written with outdated information when the data from Node 5 propagates out of the ring queue 54 and is applied to the cache 58, the correct memory data will be provided to the cache two cycles later.

With such an arrangement, the saved data is used by compare logic 59b to maintain coherency between the caches in the multiprocessing system. The arbitration mechanism used by the compare logic is described in detail below.

Figure 5:
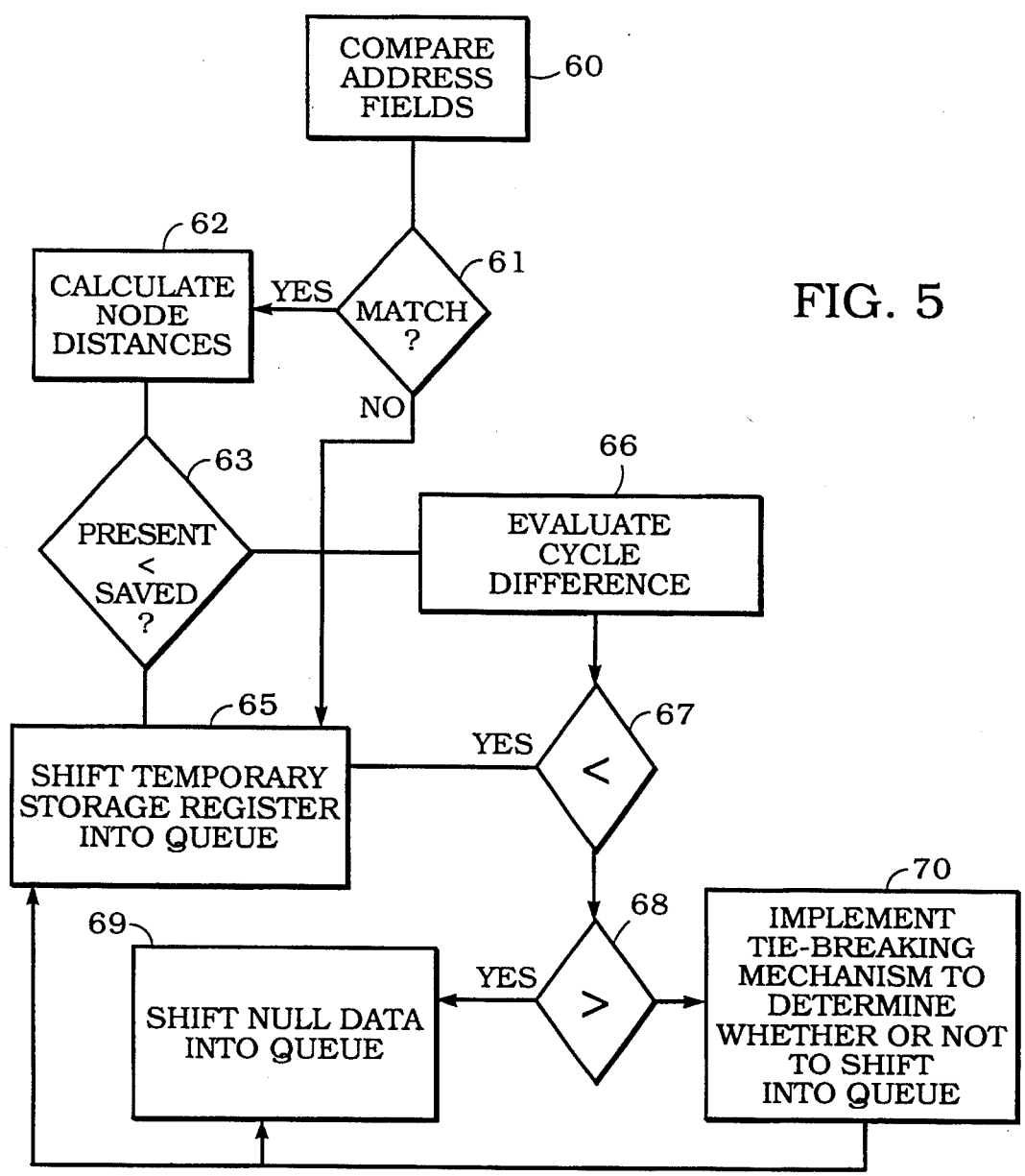
FIG. 5 is a flow diagram illustrative of the controller used to control a cache in the processor of FIG. 4.

Referring now to FIG. 5, at step 60, it is determined if there is a match between the address field of the temporary storage register 52 and any address stored in the ring queue 54. If at step 61 it is determined that there is no match between any addresses, the process proceeds to step 65. At step 65, the data from temporary storage register 52 is shifted into the ring queue 54.

If at step 61 it is determined that there is a match with any of the addresses in the ring queue 54, the process advances to step 62. There may be more than one entry having a matching address if subsequent nodes in the ring each originate an access to the same address in the memory device 20 in consecutive cycles.

At step 62, the distance between the node which originally provided the data stored in the temporary storage register 52 and the current node is evaluated. This distance is hereinafter referred to as the present slot distance. In addition, the distances between the node that originated the data entries in the ring queue 54 and the current node are evaluated. These distances are hereinafter referred to as the saved slot distances. The distance between nodes is measured by a particular node as the number of hops that the other node requires to reach the current node. In essence, it is a modular technique wherein, in the current example, referring again to FIG. 1, the distance between Node 1 and Node 3 is two, and the distance between Node 6 and Node 1 is one.

After the present slot distance and the saved slot distances have been evaluated, it is determined at step 63 whether the present slot distance is less than the saved slot distance of each entry in the ring queue 54 having an address field matching that in the temporary register 52. If the present slot distance is less than each of the saved slot distances with matching address fields, then the data which is stored in the temporary storage register 52 is the most recent data. The process then proceeds to step 65 where the data in temporary storage register 52 is shifted into the queue 54, and data from the ring queue 54 is shifted out for application to the controller 36 for application to the cache 38.

However, if the present slot distance is greater than the saved slot distance of a ring entry having a matching address, then the process proceeds to step 66. At step 66, the slot difference, i.e. the difference between the arrival of data in the temporary storage register 52 and the arrival of the data in the entry in the ring queue 54 having the matching address, is evaluated. The slot difference can be derived directly from the location of the entry in the ring queue 54. For example, given the temporary storage register 52 is one slot, the third entry of the ring queue 54 is four bus slots, and therefore the slot difference is three slots.

At step 67 the slot difference is compared to the difference in the slot distance to determine whether the temporary storage register 52 or the entry in ring queue 54 contains the most recent data. The difference in slot distance is the difference between the present slot distance and the saved slot distance, where the present slot distance is the distance between the current node and the node which transmitted the data stored in temporary storage register 52 and the saved slot distance is the distance between the current node and the node which transmitted the entry in ring queue 54. If it is determined at step 67 that the difference in slot distance is less than the slot difference, then the data in the temporary storage register 52 is the most recently updated data. The process then proceeds to step 65, and the data from the temporary storage register 52 is shifted into the ring queue 54.

If it is determined at step 67 that the difference in slot distance is not less than the slot difference, the process proceeds to step 68 where it is determined whether the difference in slot distance is greater than the slot difference. If the difference in slot distance is greater than the slot difference, the entry in the ring queue 54 contains the most recently updated version of the data, and the data in the temporary storage register 52 should be ignored. In this instance, the data in the temporary storage register 52 is discarded and NULL data is shifted into the queue 54.

If at step 68 it is determined that the difference in slot distance is equal to the slot difference, the process proceeds to step 70. At step 70 a tie-breaking mechanism which is consistently exercised by every node in the multiprocessor system 12 is implemented. A variety of mechanisms are suitable for the purpose, for example, the node that provided data which has the lowest node number would always be the node whose data is maintained as the latest data.

Depending on the location of the node in the ring, some nodes will see two conflicting writes in different orders, but by using a distributed tie-breaking algorithm, all nodes will make the same decision about which write occurred first and, as such, will update their cache with the correct data to maintain coherency throughout the multiprocessor system.

It should additionally be noted that the above described protocol for communication in a multiprocessor system may additionally be used for load-locked/store-conditional synchronization of shared memory. All normal writes can be watched and their exact time relative to a load-lock/store-conditional window can be deciphered. In addition, by placing store-conditionals on the ring, and waiting for the store-conditional to make the full traversal of the ring, only one will win the ring, and any others will fail because they were beaten to the ring.

By implementing a ring base protocol, maximal communication between nodes in a multiprocessor system may be provided while maintaining coherency throughout cache memory in the multiprocessor system. With such a design, the speed of the processors will no longer be constrained by the turnaround time of a bus because the processors are guaranteed access to the ring while other processors are also communicating on the ring. Thus, increased microprocessor performance will not be sacrificed to system bus speeds that do not increase at the same rate and, thus, a system which provides flexibility in the face of changing technology is provided.

Having described a preferred embodiment of the invention, it will now become apparent to one of skill in the art that other embodiments incorporating its concepts may be used. It is felt, therefore, that this embodiment should not be limited to the disclosed embodiment, but rather should be limited only by the spirit and scope of the appended claims.

What I claim is:

1. A method for providing communication between a plurality of nodes coupled in a ring formation, said method comprising the steps of:

receiving, at an input of each node, data from one of the neighboring nodes on said ring during a predetermined time period;

depositing data at an output of each node during said predetermined time period, wherein said data deposited by each node is either said data received at said input of said node during said predetermined time period or data provided by the respective node; and wherein said plurality nodes further comprises a plurality processors, each processor including a memory for storing a subset of shared data shared between at least two of said plurality of nodes, wherein said method further comprises the step of maintaining data coherency between each of said memories in each of said plurality of processors and said memory node, said step of maintaining coherency further comprising the steps of:

determining, at each processor, whether data received during said time period is updated data of interest to said receiving processor by:

determining a first nodal distance between a processor that transmitted said new data and said receiving processor; and determining a second nodal distance between said receiving processor and a node indicated in a node field associated with version data stored at said processor;

storing said received data at said receiving processor if the relationship between said first nodal distance and said second nodal distance indicate that said data is updated data of interest to said processor.

2. The method of claim 1, wherein said step of determining whether said data is updated data of interest to said processor further comprises the steps of:

at each node, storing a plurality of said data received at said respective input during said predetermined time period in a queue, said queue comprising an address field for storing and address said received data.

3. The method of claim 2, wherein said step of determining whether said data is of interest to said one of said processors further comprises the steps of:

as each processor receives data, comparing said received data against said plurality of saved data in said queue to determine if the address field of said received data matches the address field of any of said plurality saved data in said queue:

in the event that said new data matches one of said plurality of saved data, determining whether said new data represents updated data from said memory device; and responsive to a determination that said data is updated data of interest to said receiving processor, shifting said new data into said queue.

4. The method of claim 3, wherein said received data represents updated data if:

said first nodal distance is less than said second nodal distance.

5. The method according to claim 4, wherein said predetermined time period comprises a fixed time slot, and wherein said method of determining whether said data is updated data further comprises the steps of:

determining a cycle difference, wherein said cycle difference is the difference in the number of fixed time slots between the transmission of said received data and the transmission of said stored version of said data having said matching address:

determining a nodal difference, wherein said nodal difference is the difference between said first nodal distance and said second nodal distance;

where said data is determined to be updated data if said nodal difference is less than said cycle difference; and wherein said data is determined to not to be updated if said nodal difference is greater than said cycle difference.

6. The method of claim 5, further comprising the step of:

providing a decision mechanism to allow each of said processors to consistently either shift said new data into said queue or preclude said new data from being stored in said queue, said decision mechanism operating in response to said nodal difference being equal to said cycle difference.

7. An apparatus comprising:

a bus arranged in a ring and having a protocol dividing transfer of data on said bus into a plurality of fixed time slots; and a plurality of nodes, coupled for point to point communication on said ring, each of said nodes being assigned a unique node number and communicating with said bus by transmitting data during one of said plurality of fixed time slots, wherein a portion of said of plurality of nodes comprises a plurality of processors, and wherein each of said processors further comprise a first memory, for storing a subset of shared data, said subset of shared data shared between at least two of said plurality of nodes;

means, at each node for receiving data from other nodes on said ring, wherein said received data comprises a node field and an address field;

means for maintaining coherency between said memories of said nodes including means, responsive to a match between said address field of said received data and an address of a version of said data stored at said receiving node, for determining a first distance and a second distance, wherein said first distance is the distance between the node indicated in the node field of the retrieved data and the node receiving the data, and the second distance is the distance between the mode receiving the data and a node associated with the stored version of the data at said received node.

8. The apparatus of claim 7, wherein one of said plurality of nodes is a memory, and wherein said shared data is further shared between said memory and one of said first memories of said processors.

9. The apparatus of claim 7, wherein each of said plurality of processors further comprises:

queue means for storing said received data; and means for comparing the address field of said data received during each time slot against each of the address fields of said received data stored in said queue.

10. The apparatus of claim 7, wherein said means for comparing further comprises:

means, responsive to said first distance being less than said second distance, for shifting said retrieved bus data into said queue.

11. The apparatus of claim 10, further comprising:

means, responsive to said first distance being greater than said second distance, for determining a cycle difference, wherein the cycle difference is the number of fixed time slots between the time slot in which data is received by the retrieving node, and time slot in which data is received by the node having the matching address in the queue;

means for determining a node difference, wherein said node difference is the difference between said first distance and said second distance;

means, responsive to said node difference being less than said cycle difference, for shifting said retrieved into said queue; and means, responsive to said node difference being greater than said cycle difference, for precluding storage of said retrieved data in said queue.

12. The apparatus of claim 11, further comprising:

means, responsive to said node difference being equal to said cycle difference and responsive to a fixed decision mechanism, for shifting said retrieved data into said queue, wherein said fixed decision mechanism is performed by each of said processors on said bus.

* * * * *